United States Patent
Mokuya et al.

(10) Patent No.: US 8,390,840 B2
(45) Date of Patent: Mar. 5, 2013

(54) AUTHENTICATION-BASED PRINTING SYSTEM AND AUTHENTICATION-BASED PRINTING METHOD FOR HANDLING PRINT JOBS OF DIFFERENT FORMATS

(75) Inventors: Senichi Mokuya, Shiojiri (JP); Naruhide Kitada, Nagano-ken (JP); Yusuke Takahashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1328 days.

(21) Appl. No.: 11/518,315

(22) Filed: Sep. 11, 2006

(65) Prior Publication Data
US 2007/0064269 A1 Mar. 22, 2007

(30) Foreign Application Priority Data
Sep. 21, 2005 (JP) ................................ 2005-274336

(51) Int. Cl.
*G06K 15/00* (2006.01)
*G06F 3/12* (2006.01)
(52) U.S. Cl. ...................................... 358/1.15; 358/1.14
(58) Field of Classification Search ................. 358/1.14, 358/1.15
See application file for complete search history.

(56) References Cited

U.S. PATENT DOCUMENTS

| | | | | |
|---|---|---|---|---|
| 2002/0027673 A1* | 3/2002 | Roosen et al. | ............... | 358/1.13 |
| 2003/0133146 A1* | 7/2003 | Parry | ........................... | 358/1.15 |
| 2005/0073709 A1* | 4/2005 | Kujirai et al. | ............... | 358/1.14 |
| 2005/0275876 A1* | 12/2005 | McLean et al. | ............... | 358/1.15 |

FOREIGN PATENT DOCUMENTS
JP 3034160 B2 2/2000
* cited by examiner

*Primary Examiner* — Mark K Zimmerman
*Assistant Examiner* — Fred Guillermety
(74) *Attorney, Agent, or Firm* — Sughrue Mion, PLLC

(57) ABSTRACT

A system including an authentication unit and an authentication-based print-job generation unit including: a job acquisition module that acquires a print-job in a first format processable by a first printing device and a print-job in a second format processable by a second printing device; a module that acquires printing person identification information; and a module that generates an authentication-based print-job by adding the acquired printing person identification information to the acquired print-job, and outputs it to the authentication unit. The authentication unit includes: a module that acquires the authentication-based print-job; a module that extracts the printing person identification information and the print-job, and stores them in a storage module; a module that executes authentication for a user who requests printing execution; a module that selects from the storage module a print-job associated with the printing person identification information for the authenticated user; and a module that outputs the selected print-job.

10 Claims, 7 Drawing Sheets

| PRINTING PERSON IDENTIFICATION INFORMATION | PRINT-JOB STORING ADDRESS | RELATED INFORMATION (DOCUMENT NAME) |
|---|---|---|
| 0012123 | ******** | SPECIFICATION. DOC |
| 0012127 | ******** | BUSINESS TRIP REPORT. DOC |
| 9999999 | ******** | UNTITLED. DOC |

FIG.7

US 8,390,840 B2

AUTHENTICATION-BASED PRINTING SYSTEM AND AUTHENTICATION-BASED PRINTING METHOD FOR HANDLING PRINT JOBS OF DIFFERENT FORMATS

CROSS-REFERENCES TO RELATED APPLICATIONS

The entire disclosure of Japanese Patent Application No. 2005-274336, filed on Sep. 21, 2005, is expressly incorporated herein by reference.

BACKGROUND

1. Technical Field

The present invention relates to authentication-based printing technology that allows execution of printing upon authentication.

2. Related Art

Authentication-based printing structures, where, to prevent information leaks and other risks, execution of printing is only allowed for an authenticated user, have been well known. For example, Japanese Patent No. 3034160 discloses a structure where a confidential document is not printed out immediately upon a printing instruction for that document, but is printed out upon a user having been authenticated as an authorized user, using image data, which has been made based on the data to be printed and stored in the printing device.

In this type of authentication-based printing structure, an authenticated printing person will be permitted to execute printing only for the print-jobs for which the user has been authorized. In conventional structures, whether a user has been authorized for a specific print-job is usually determined by analyzing that print-job to extract the user information, and then using the extracted user information.

However, in the current situation, different printer manufacturers use largely different print-job formats, and one reason for that is that printer control languages used for generating print-jobs have been developed independently by those different printer manufacturers and other developers.

Thus, for a printing device accepting print-jobs generated using a publicly disclosed format (or a format defined by the same developer that developed the printing device), it is possible to realize the above-mentioned authentication-based printing structure because those print-jobs can be analyzed and the necessary user information can be extracted; whereas it has not been possible to realize that authentication-based printing structure for a printing device accepting print-jobs generated using a private format, because the necessary user information cannot be extracted from those print-jobs.

Furthermore, some print-jobs include no user information, and for a printing device accepting such print-jobs, the authentication-based printing structure obviously cannot be realized even if the formats for the jobs are publicly disclosed.

SUMMARY

In light of the above, an advantage of some aspects of the invention is to provide an authentication-based printing function for any printing device, regardless of whether the print-jobs to be accepted by that printing device are based on a publicly disclosed format or not, and also regardless of whether the print-jobs include user information or not.

According to an aspect of the invention, provided is an authentication-based printing system providing an authentication-based printing function for both a first printing device and a second printing device, including: an authentication-based print-job generation unit; and an authentication unit, wherein the authentication-based print-job generation unit includes: a job acquisition module that is configured to be able to acquire a print-job in a first format that can be processed by the first printing device and a print-job in a second format that can be processed by the second printing device, the second format being a format that cannot be processed by the first printing device or a format with no information for specifying a printing person added; a module that acquires, with respect to the print-job acquired by the job acquisition module, identification information for either a user who has ordered that print-job or another user specified as a printing person, as printing person identification information; and a module that generates an authentication-based print-job by adding the acquired printing person identification information to the print-job acquired by the job acquisition module, and outputs the generated authentication-based print-job to the authentication unit, and wherein the authentication unit includes: a module that acquires the authentication-based print-job; a module that extracts from the acquired authentication-based print-job the printing person identification information and the print-job, and stores them in a storage module in association with each other; a module that executes authentication for a user who requests execution of printing; a module that refers to the storage module, and selects a print-job associated with the printing person identification information for the authenticated user; and a module that outputs the selected print-job to the first printing device or the second printing device.

The authentication unit is preferably configured to include at least one of the first printing device and the second printing device.

According to the above configuration, the authentication unit can select a print-job (original print-job) for which an authenticated user has been authorized, by referring to the printing person identification information, without the need to interpret the original print-jobs to be handled by the first printing device or the second printing device. Accordingly, if the original print-jobs are based on a private format, or if the original print-jobs include no user information for specifying the printing person, i.e., regardless of the format of the original print-jobs, the authentication-based printing function can be properly provided for a printing device handling those print-jobs.

According to another aspect of the invention, provided is an authentication-based print-job generation unit providing, in cooperation with an authentication unit, an authentication-based printing function for both a first printing device and a second printing device, the authentication unit having functions for acquiring an authentication-based print-job that is configured to include printing person identification information and a print-job; extracting from the acquired authentication-based print-job the printing person identification information and the print-job, and storing them in a storage module in association with each other; executing authentication for a user who requests execution of printing; referring to the storage module and selecting a print-job associated with the printing person identification information for the authenticated user; and outputting the selected print-job to the first printing device or the second printing device, the authentication-based print-job generation unit including: a job acquisition module that is configured to be able to acquire a print-job in a first format that can be processed by the first printing device and a print-job in a second format that can be processed by the second printing device, the second format being a format that cannot be processed by the first printing device or a format with no information for specifying a printing person added; a module that acquires, with respect to the print-job acquired by the job acquisition module, identification information for either a user who has ordered that print-job or another user specified as a printing person, as printing person identification information; and a module that generates an authentication-based print-job by adding the acquired printing person identification information to the print-job acquired by the job acquisition module, and outputs the generated authentication-based print-job to the authentication unit.

According to another aspect of the invention, provided is an authentication unit providing, in cooperation with an authentication-based print-job generation unit, an authentication-based printing function for both a first printing device and a second printing device, the authentication-based print-job generation unit having functions for acquiring a print-job in a first format that can be processed by the first printing device or a print-job in a second format that can be processed by the second printing device, the second format being a format that cannot be processed by the first printing device or a format with no information for specifying a printing person added; acquiring identification information for either a user who has ordered that acquired print-job or another user specified as a printing person, as printing person identification information; and generating an authentication-based print-job by adding the acquired printing person identification information to the acquired print-job and outputting the generated authentication-based print-job to the authentication unit, the authentication unit including: a module that acquires the authentication-based print-job; a module that extracts from the acquired authentication-based print-job the printing person identification information and the print-job, and stores them in a storage module in association with each other; a module that executes authentication for a user who requests execution of printing; a module that refers to the storage module, and selects a print-job associated with the printing person identification information for the authenticated user; and a module that outputs the selected print-job to the first printing device or the second printing device.

According to another aspect of the invention, provided is an authentication-based printing method for both a first printing device and a second printing device, the method including, under the control of an authentication-based print-job generation unit, acquiring a print-job in a first format that can be processed by the first printing device or a print-job in a second format that can be processed by the second printing device, the second format being a format that cannot be processed by the first printing device or a format with no information for specifying a printing person added; acquiring, with respect to the acquired print-job, identification information for either a user who has ordered that print-job or another user specified as a printing person, as printing person identification information; and generating an authentication-based print-job by adding the acquired printing person identification information to the acquired print-job, and outputting the generated authentication-based print-job to an authentication unit, the method also including, under the control of the authentication unit, acquiring the authentication-based print-job; extracting from the acquired authentication-based print-job the printing person identification information and the print-job, and storing them in a storage module in association with each other; executing authentication for a user who requests execution of printing; referring to the storage module, and selecting a print-job associated with the printing person identification information for the authenticated user; and outputting the selected print-job to the first printing device or the second printing device.

According to another aspect of the invention, provided is a method for outputting an authentication-based print-job to an authentication unit that provides an authentication-based printing function for both a first printing device and a second printing device, the method including: acquiring a print-job in a first format that can be processed by the first printing device or a print-job in a second format that can be processed by the second printing device, the second format being a format that cannot be processed by the first printing device or a format with no information for specifying a printing person added; acquiring, with respect to the acquired print-job, identification information for either a user who has ordered that print-job or another user specified as a printing person, as printing person identification information; and generating an authentication-based print-job by adding the acquired printing person identification information to the acquired print-job, and outputting the generated authentication-based print-job to the authentication unit.

According to another aspect of the invention, provided is a method for executing authentication-based printing in accordance with an authentication-based print-job with respect to both a first printing device and a second printing device, the authentication-based print-job being configured by adding to a print job in a first format that can be processed by the first printing device or a print-job in a second format that can be processed by the second printing device, the second format being a format that cannot be processed by the first printing device or a format with no information for specifying a printing person added, identification information for either a user who has ordered that print-job or another user specified as a printing person, as printing person identification information, the method including: acquiring the authentication-based print-job; extracting from the acquired authentication-based print-job the printing person identification information and the print-job, and storing them in a storage module in association with each other; executing authentication for a user who requests execution of printing; referring to the storage module, and selecting a print-job associated with the printing person identification information for the authenticated user; and outputting the selected print-job to the first printing device or the second printing device.

Each method according to an aspect of the invention can be implemented in an authentication-based printing system, an authentication-based print-job generation unit, and an authentication unit, by their relevant computers, and computer programs for that implementation can be installed or loaded on the computer (for example, a host device, an authentication server, an information processing unit in the printing device) via various media such as a CD-ROM, a magnetic disk or semiconductor memory, or via a communication network.

DESCRIPTION OF EXEMPLARY EMBODIMENTS

First Embodiment

Figure 1:
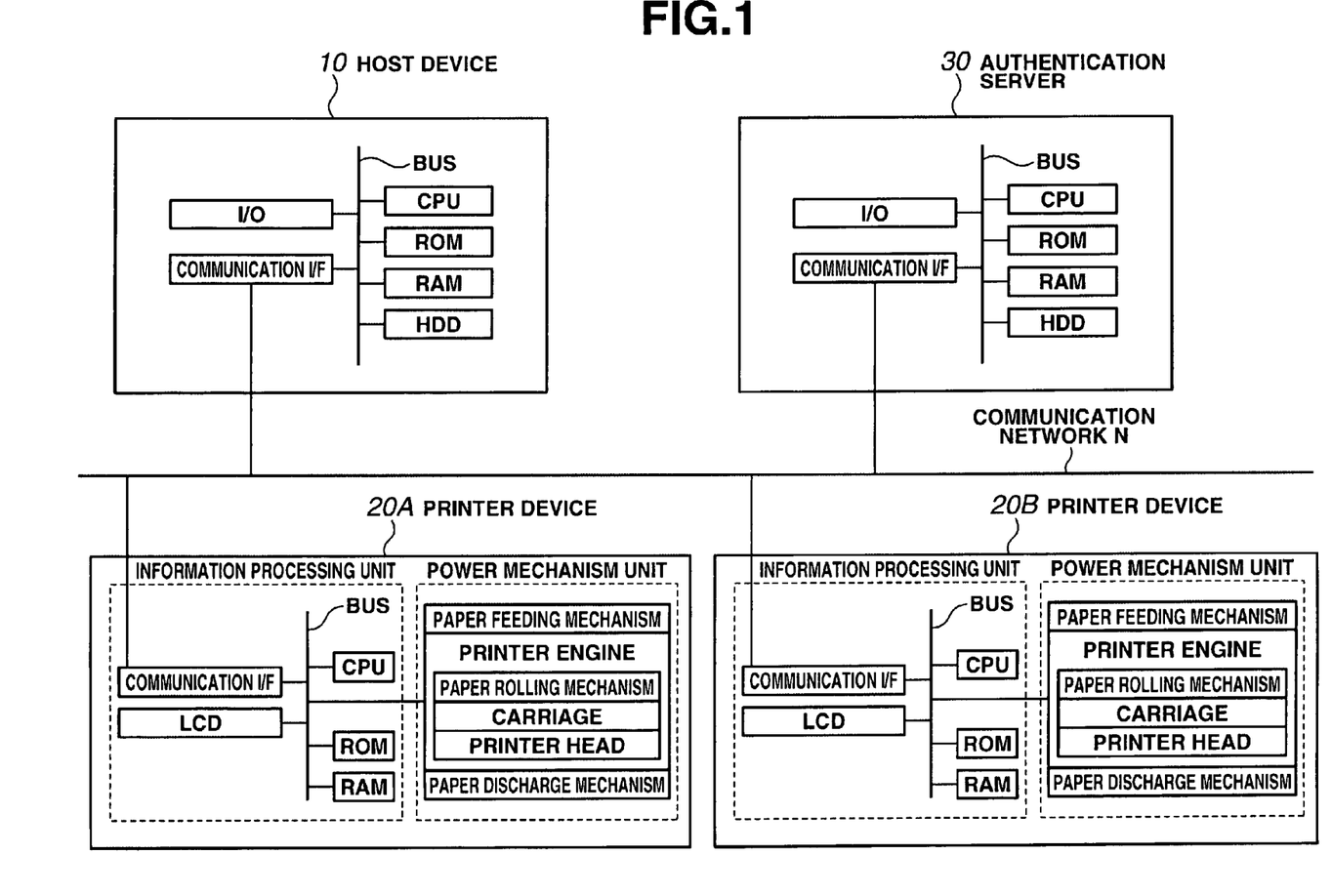
FIG. 1 is a block diagram illustrating the hardware configuration of an authentication-based printing system 1 according to a first embodiment of the invention.

FIG. 1 is a block diagram illustrating the hardware configuration of an authentication-based printing system 1 according to an embodiment of the invention. As shown in FIG. 1, the authentication-based printing system 1 includes: a host device 10; a printer device 20A; a printer device 20B that can process print-jobs in formats that cannot be processed by the printer device 20A, or print-jobs in formats with no user information added, or both; and an authentication server 30. These devices are configured to communicate with each other via a communication network N (N may be, for example, a LAN, internet, dedicated line, packet communication network, or any combination thereof, and both wired and wireless networks may be used). In FIG. 1, the authentication-based printing system 1 includes one host device 10, one printer device 20A, another printer device 20B, and one authentication server 30, but the authentication-based printing system 1 may be configured to include any number of those devices according to the system design.

The host device 10 is configured to include hardware resources such as a CPU (processor), ROM, RAM, an I/O controller, a communication interface and a HDD, and the CPU is configured to be able to access each module via a bus.

Figure 2A:
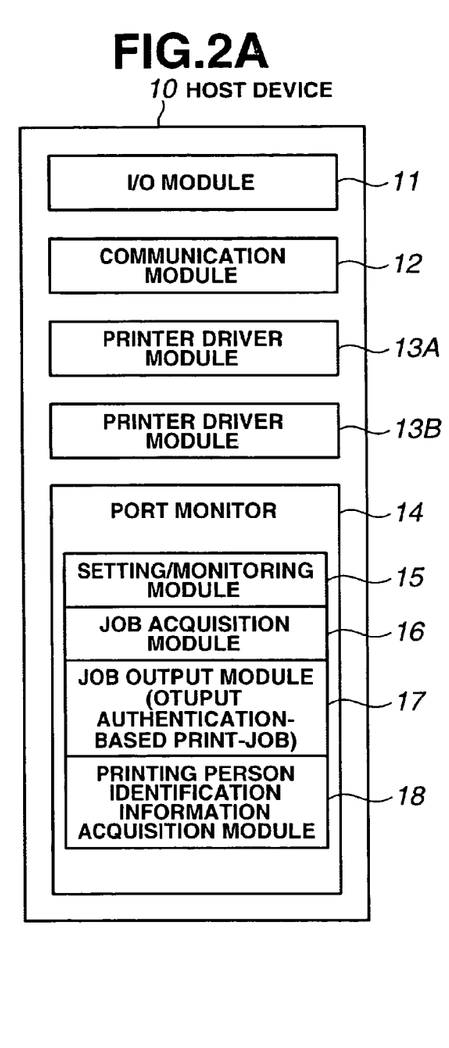
FIGS. 2A to 2C are block diagrams illustrating the functional configurations of a host device 10, a printer device 20 and an authentication server 30.
Figure 2B:
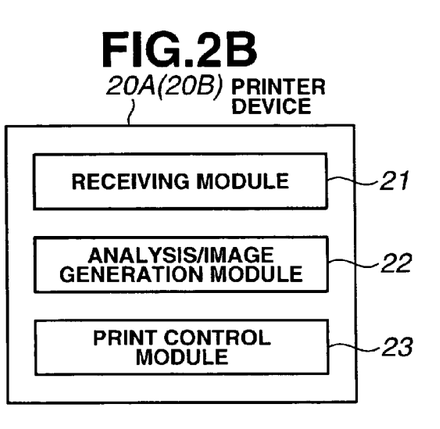
Figure 2C:
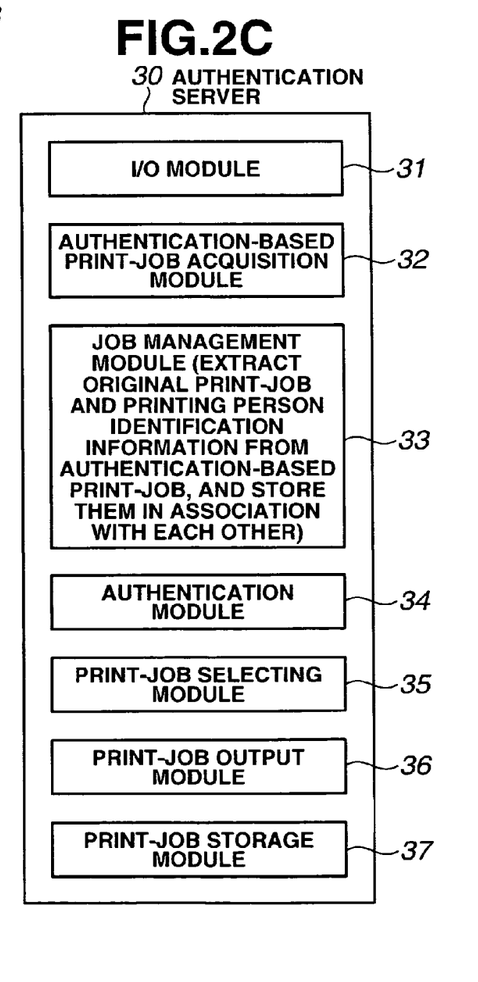

The host device 10 is provided with the same functions as normal information processing devices such as normal personal computers. For example, the host device 10 has: an I/O module 11 for receiving various inputs from, and also outputting information to, a user via the I/O controller; a communication module 12 for sending/receiving various kinds of data to/from other devices via the communication interface; printer driver modules 13A and 13B for controlling the printer devices; and a port monitor 14 (see FIG. 2). The functions of those modules are realized by the CPU executing programs stored, for example, in the ROM, RAM or HDD in the host device 10, or in external storage media.

The printer driver modules 13A and 13B provided correspond to the printer devices 20A and 20B respectively, and each has a function that generates print-jobs in formats that can be processed by its corresponding printer device, like normal printer drivers. For example, when an application program running on the host device 10 makes a printing request specifying the printer device 20A, the printer driver module 13A generates a print-job in accordance with a printer control language that can be interpreted by the printer device 20A, and transfers the generated job to the port monitor 14.

The port monitor 14 has the same functions that normal port monitors have. For example, the port monitor 14 has: a setting/monitoring module 15 for setting and monitoring the status of the printer devices 20A and 20B, etc., using SNMP (Simple Network Management Protocol); a job acquisition module 16 that receives print-jobs from the printer driver modules 13A and 13B; and a job output module 17 that outputs print-jobs to the corresponding printer devices using a RAW printing protocol, an LPR printing protocol, or other such protocols, when normal printing is to be executed.

However, the port monitor 14 in this embodiment is different from conventional ones in that it is configured to have a module 18 for acquiring, with respect to the print-job (original print-job) that the job acquisition module 16 has acquired, identification information for either the person who has ordered that print-job, or someone specified as a printing person by that ordering person, as printing person identification information, while also being configured so that the job output module 17 generates, when authentication-based printing is to be executed, an authentication-based print-job by adding the so-acquired printing person identification information to the original print-job that the job acquisition module 16 has acquired, and then outputs that authentication-based print-job to the authentication server 30. The details will be explained later.

The printer devices 20A and 20B are configured the same way normal printer devices are.

For example, the printer devices 20A and 20B each have a power mechanism unit composed of a paper feeding mechanism for supplying paper into the printer device, a printer engine for performing print output, and a paper discharging mechanism for ejecting paper to the outside of the printer device. The printer engine is normally configured to include, for example, a paper rolling mechanism, a carriage mechanism and a printer head, and various types of printer engines can be used, according to the printer type—serial printers (character printers) that print a single character at a time, such as inkjet printers or thermal-transfer printers; line printers that print a single line at a time; page printers that print a single page at a time, and other types of printers.

Each of the printer devices 20A and 20B also includes an information processing unit for controlling the power mechanism unit and making it execute printing, the information processing unit being composed of, for example, a CPU (processor), ROM, RAM, an LCD panel, an LCD controller, and a communication interface. The CPU is configured to be able to access each module via a bus, and, for example, controls the power mechanism unit to make it execute actual printing in accordance with print-jobs sent via the communication interface. The power mechanism unit may independently have its own CPU, and in that case, the CPU in the power mechanism unit communicates with the CPU in the information processing unit via a parallel interface or similar, and controls the printer engine to make it execute printing.

The printer devices 20A and 20B have basically the same functions that conventional printer devices have (see FIG. 2). For example, each printer device has: a receiving module 21 that receives print-jobs; an analysis/image generation module 22 that analyzes those print-jobs to generate one band or one page of raster print images and store them in a image buffer; and a print control module 23 that transfers a predetermined unit (e.g. one path) of print images to the printer engine in accordance with the control command in the print-job, and executes printing by controlling the printer engine. However, as explained before, the printer device 20B is different in that it is configured to be capable of processing print-jobs in formats that cannot be processed by the printer device 20A, or print-jobs in formats with no user information added, or both. The functions of the above-explained modules are realized by the CPU executing programs stored, for example, in the ROM or RAM in the printer device 20 or in other external storage media.

The authentication server 30 is configured to include hardware resources such as a CPU (processor), ROM, RAM, an I/O controller, a communication interface, and a HDD, and the CPU is configured to be able to access each module via a bus.

Seen from the functional viewpoint, the authentication server 30 has: an I/O module 31 for receiving various inputs from, and also outputting information to, a user via the I/O controller; a module 32 for acquiring an authentication-based print-job from (the port monitor 14 in) the host device 10; a job management module 33 for extracting the print-job (original print-job) and the printing person identification information from the acquired authentication-based print-job, and storing them in a print-job storage module 37 in association with each other; an authentication module 34 for executing authentication in accordance with authentication information acquired from a user requesting execution of printing; and a module 35 for recognizing the user that has identified themselves via the authentication as a printing person, referring to the print-job storage module 37, and selecting an original print-job associated with the printing person identification information for that recognized printing person; and a module 36 for outputting the selected original print-job to the corresponding printer device, either 20A or 20B (see FIG. 2). The functions of the above modules are realized by the CPU executing programs stored, for example, in the ROM, RAM or HDD in the authentication server 30 or in other external storage media.

Figure 3:
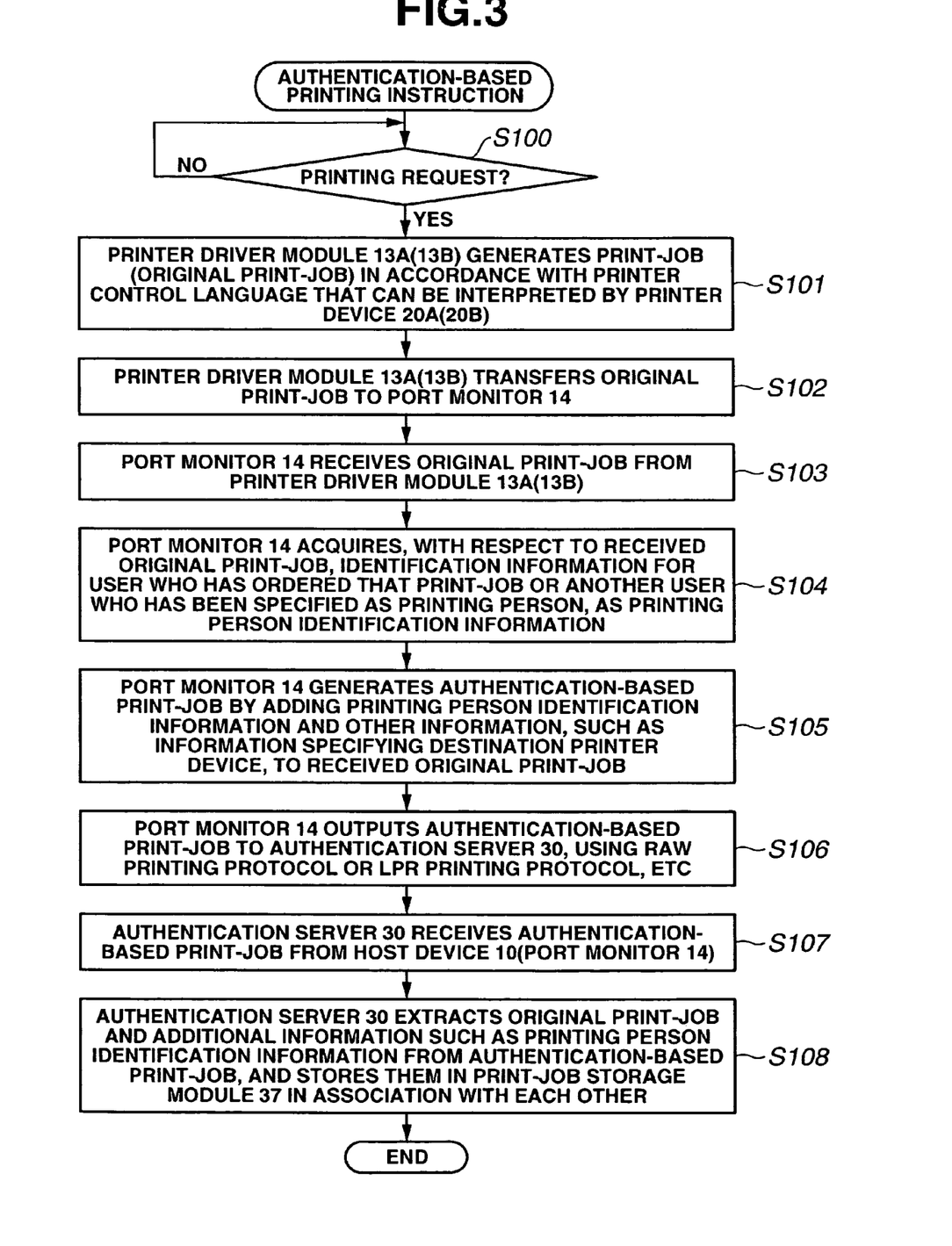
FIG. 3 is a flowchart for explaining an authentication-based printing structure (authentication-based printing instruction) in the authentication-based printing system 1.
Figure 4:
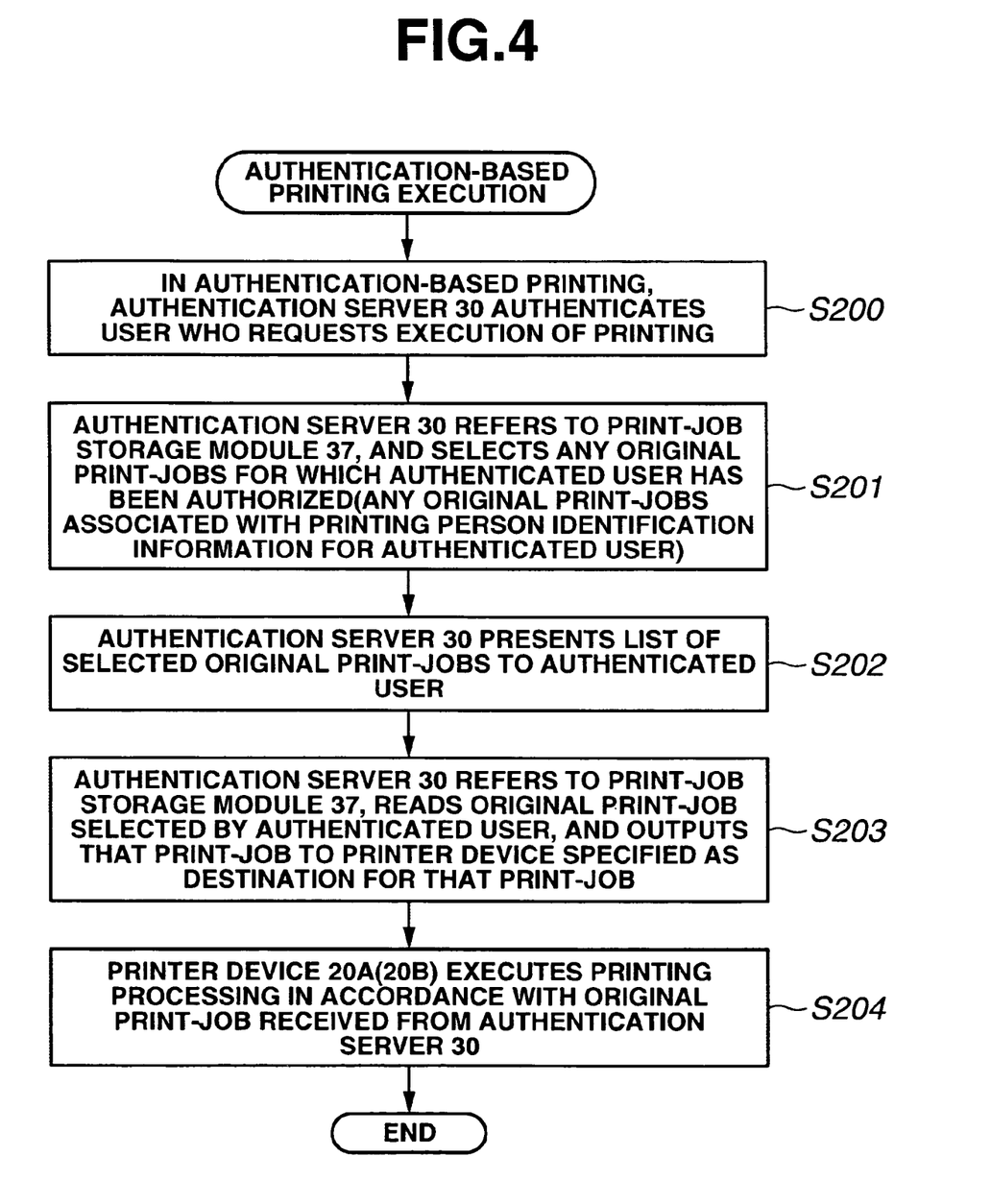
FIG. 4 is a flowchart for explaining an authentication-based printing structure (authentication-based printing execution) in the authentication-based printing system 1.

Next, the authentication-based printing structure in the authentication-based printing system 1 is explained below with reference to the flowcharts shown in FIGS. 3 and 4. The steps (or portions in each step with no reference numerals added) may have their order changed arbitrarily, or may be executed in parallel, as long as no operational conflicts arise.

Authentication-Based Printing Instruction: FIG. 3

When the printer driver module 13A (or 13B) in the host device 10 receives a printing request specifying the printer device 20A (or 20B) from an application program running externally or on the host device 10 (S100), it generates a print-job (original print-job) in accordance with a specific printer control language that can be interpreted by the printer device 20A (or 20B) (S101), and transfers the generated print-job to the port monitor 14 (S102).

When authentication-based printing is to be executed, and the port monitor 14 receives the original print-job from the printer driver module 13A (or 13B) (S103), the port monitor 14 acquires, with respect to the received original print-job, identification information for either the user who has ordered that print-job or another user who has been specified as a printing person, as printing person identification information (S104).

Figure 5:
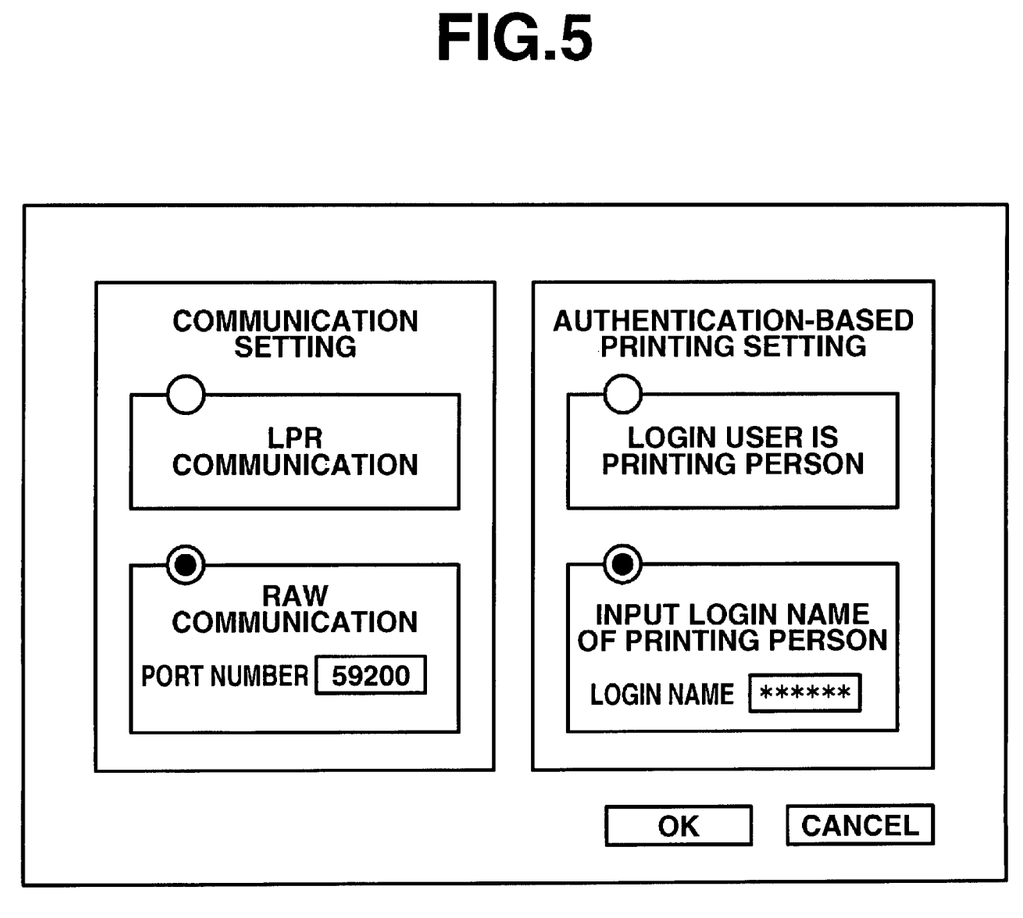
FIG. 5 illustrates an example of a screen used for specifying a printing person.

The user identification information may be, for example, a login name in the host device 10. Normally, the user who has ordered the original print-job is assumed to be the current login user in the host device 10, so the login name of the user who ordered the original print-job can be acquired, for example, using a function provided by the OS running on the host device 10. On the other hand, the user who has ordered the original print-job may also specify another user as a printing person. So, the port monitor 14 preferably presents a screen as shown in FIG. 5 to the user, where the user can select whether they will be specified as the printing person, or a different user will be specified as the printing person, and in the latter case, where the user can also input printing person identification information for the specified user, such as the login name of the specified user.

Next, the port monitor 14 generates an authentication-based print-job by adding the above acquired printing person identification information and other information, such as information specifying a destination printer device (e.g. a device model number), to the received original print-job (S105). In addition to the above, various kinds of information, such as information concerning a password used for authentication, the document name, the job ID, the host device name, the start time of printing, printing priority, the number of pages, and the data size, etc., may be added to the original print-job. Also, the above information may be added to the original print-job in various ways, for example, in the form of an extra print-job header.

Then, the port monitor 14 outputs the generated authentication-based print-job to the authentication server 30, for example, using the RAW or LPR printing protocol (S106).

Figure 6:
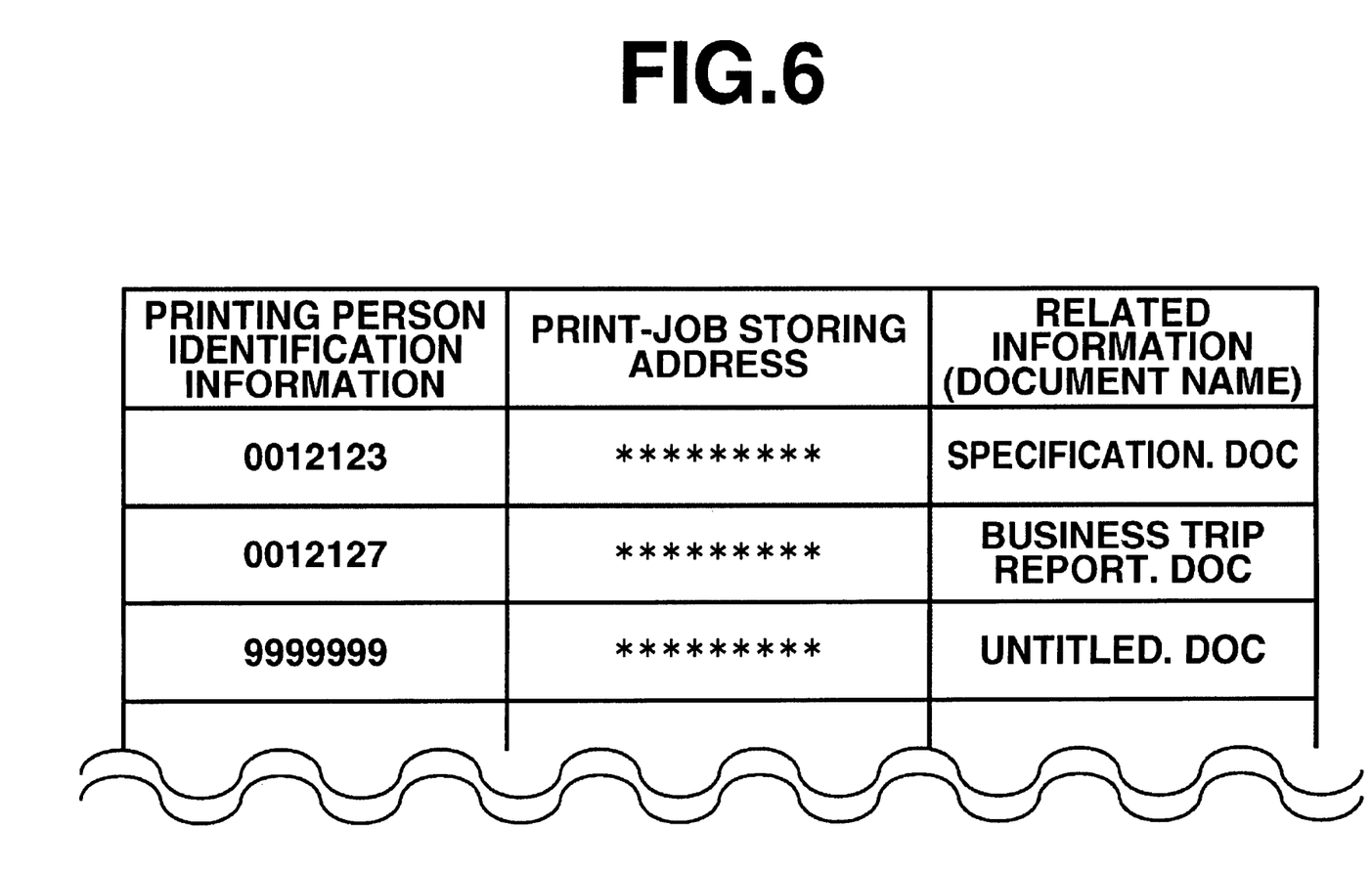
FIG. 6 illustrates an example of a table storing the correlation between print-jobs and additional information such as printing person identification information.

When receiving the authentication-based print-job from (the port monitor 14 in) the host device 10 (S107), the authentication server 30 extracts the original print-job and the additional information such as the printing person identification information from the received authentication-based print-job, and stores them in the print-job storage module 37 in association with each other (S108). FIG. 6 shows an example of a table for storing the above-mentioned correlation between the original print-job and the additional information. That data management using a table can be realized via conventional database technologies such as a relational database system.

Authentication-Based Printing Execution: FIG. 4

In the authentication-based printing, the authentication server 30 authenticates a user who requests execution of printing (S200).

An example of that authentication method is one using authentication cards. More specifically, if a user requesting execution of printing ("print-requesting user") enters their authentication card into a card reader (not shown in the drawing), and if valid authentication information is recorded on the card, that user is interpreted as having been authenticated (that print-requesting user has been identified as themself). Authentication may also be executed using a password, etc., input by the print-requesting user from the I/O module 31. If the print-requesting user has not been authenticated, specific error information is configured to be output via the I/O module 31.

Next, the authentication server 30 refers to the print-job storage module 37, and selects any original print-jobs for which the user that has been authenticated (hereinafter referred to as an "authenticated user") has been authorized, in other words, any original print-jobs associated with the printing person identification information for the authenticated user (S201).

Figure 7:
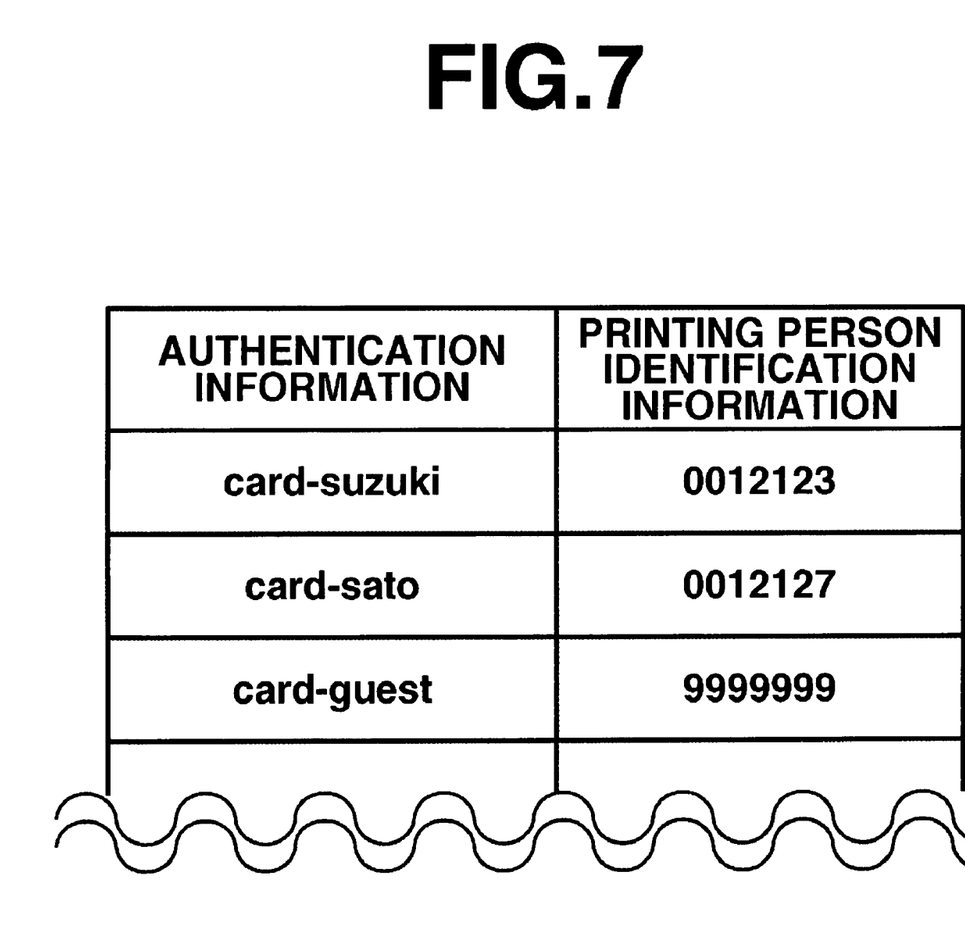
FIG. 7 is a diagram for explaining a table associating authentication information with printing person identification information.

Here, if the printing person identification information is recorded on the authentication card as information to be used for authentication, the printing person identification information for the authenticated user can be obtained by reading their authentication card using a card reader. On the other hand, if information other than the printing person identification information, for example, the name of the card holder, is recorded on the authentication card used for authentication, the printing person identification information for the authenticated user may be obtained, for example, by storing a table showing the correlation between the information to be used for authentication and the printing person identification information in the authentication server 30 or other external server in advance, as shown in FIG. 7, and referring to that same table.

Next, the authentication server 30 presents the list of the above selected original print-jobs to the authenticated user via the I/O module 31 (S202). If the additional information for the authentication-based print-job includes, for example, the document name, the list is configured to include that document name. Also, information about the printer device specified as the print-job output destination is preferably presented in the list.

Using the above list, the authenticated user can select an original print-job to undergo the printing processing.

If the authentication-based printing system 1 includes several printer devices of the same type, a screen (window) for selecting a printer device is preferably presented to the authenticated user so that they can select the printer device in which the printing processing is to be performed. Also, from a security viewpoint, it is better to collect a printed article [from the printer] immediately after it is printed. However, if the physical locations of the printer devices 20A and 20B are distant from each other, and if printing is performed using the two devices simultaneously, it will naturally be difficult to collect the printed articles immediately after they are printed. In light of that situation, the list is preferably configured to present the original print-jobs that can be processed by a single printer device (or printer devices that are located nearby), as selectable original print-jobs.

Next, the authentication server 30 refers to the print-job storage module 37, reads the original print-job selected by the authenticated user, and outputs that print-job to the printer device specified as the destination for that print-job (printer device 20A or 20B) (S203). Original print-jobs that have already been output to the relevant printer device are preferably deleted from the print-job storage module 37 at a specific time (for example, when receiving a print completion notice from the printer device, or after a specific period of time has elapsed).

When the printer device 20A (or 20B) receives an original print-job from the authentication server 30, it executes the printing processing based on the original print-job, as is conventionally done (S204). More specifically, the printer device 20A (or 20B) analyzes the received original print-job, generates a raster print image for one band or for one page and stores them in an image buffer, transfers a specific unit (e.g. one path) of print images from the image buffer to the printer engine, and executes printing by controlling the printer engine.

As described above, this embodiment employs a configuration where the port monitor 14 generates an authentication-based print-job by adding printing person identification information to a print-job (original print-job) output from the printer driver module 13A or 13B, and the authentication server 30 stores, in accordance with that authentication-based print-job, the original print-job and the relevant printing person identification information in association with each other. With this configuration, the authentication server 30 can select any original print-jobs for which an authenticated user has been authorized, by referring to the printing person identification information, without the need to interpret the original print-jobs generated by the printer driver module 13A or 13B, and accordingly, even if the original print-jobs are based on private formats, or if the original print-jobs do not include any user information for specifying the printing person, in other words, regardless of what format the original print-jobs use, the authentication-based printing function can be properly provided for a printer device handling those original print-jobs.

Furthermore, according to the configuration of this embodiment, the authentication-based printing structure can be realized without making any change to conventional configurations concerning the printer driver modules 13A and 13B, and printer devices 20A and 20B.

Other Embodiments

The invention is not limited to the above-described embodiment, and can be applied with modifications in various ways. For example, the above embodiment is explained as an authentication-based printing system including printer devices 20 as printing devices. However, the invention can be applied to an authentication-based printing system having copiers, facsimile machines, or other complex machines, as printing devices.

Also, in the above embodiment, the port monitor 14 is configured to have a function that generates authentication-based print-jobs. However, that function may be realized by a functional unit other than the port monitor 14 (for example, the printer driver module, or something external to the host device 10).

Also, in the above embodiment, the authentication server 30 is explained as a unit separate from both of the printer devices 20A and 20B. However, the authentication server 30 may be configured to include at least either of the printer devices 20A and 20B (i.e., the authentication server 30 may be configured to have a printing function too).

Also, in the above embodiment, the authentication method employed in the authentication server 30 is explained as one using authentication cards. However, the invention is not limited to this, and it is possible to choose any suitable method from among conventional authentication methods, and configure the system according to the chosen method. For example, the actual authentication processing may be performed at an external server by instructing a print-requesting user to input their ID and password and providing that input information to the external server.

Also, in the above embodiment, in addition to the printing user identification information, information for specifying the output destination printer device is given as an example of the information to be added to the original print-jobs. However, for example, if the authentication server 30 has a different port for receiving authentication-based print-jobs for each printer device, the authentication server 30 can determine the output destination printer device, without adding information for specifying the output destination printer device to the original print-jobs.

As described above, according to the invention, an authentication-based printing function can be provided for any printing device, regardless of whether the print-jobs to be accepted by that printing device are based on a publicly disclosed format or not, and also regardless of whether the print-jobs include user information or not.

What is claimed is:

1. An authentication-based printing system providing an authentication-based printing function for both a first printing device and a second printing device, comprising:
an authentication-based print-job generation unit; and
an authentication unit,
wherein the authentication-based print-job generation unit comprises:
a first central processing unit configured to access:
a job acquisition module that is configured to be able to acquire, from a first printer driver, a print-job in a first format that can be processed by the first printing device and, from a second printer driver, a print-job in a second format that can be processed by the second printing device, the second format being a format that cannot be processed by the first printing device or a format with no information for specifying a printing person added;
a module that acquires, with respect to the print-job acquired by the job acquisition module, identification information for either a user who has ordered that print-job or another user specified as a printing person, as printing person identification information; and a module that generates an authentication-based print-job by adding the acquired printing person identification information and information specifying a destination printer device to the print-job acquired by the job acquisition module, and outputs the generated authentication-based print-job to the authentication unit, and wherein the authentication unit comprises:

a second central processing unit configured to access:

a module that acquires the authentication-based print-job output from the authentication-based print-job generation unit;

a module that extracts, from the acquired authentication-based print-job, the printing person identification information, the information specifying the destination printer device, and the print-job, and stores them in a storage module in association with each other;

a module that executes authentication for a user who requests execution of printing;

a module that refers to the storage module, and selects a print-job associated with the printing person identification information for the authenticated user; and a module that outputs the selected print-job to the first or second printing device specified by the information specifying the destination printer device.

2. The authentication-based printing system according to claim 1, wherein the authentication unit is configured to include at least one of the first printing device and the second printing device.

3. An authentication-based print-job generation unit providing, in cooperation with an authentication unit, an authentication-based printing function for both a first printing device and a second printing device, the authentication unit having a first central processing unit configured to execute functions for acquiring an authentication-based print-job that is configured to include printing person identification information and a print-job output from the authentication-based print-job generation unit; extracting from the acquired authentication-based print-job the printing person identification information, information specifying a destination printer device, and the print-job, and storing them in a storage module in association with each other; executing authentication for a user who requests execution of printing; referring to the storage module and selecting a print-job associated with the printing person identification information for the authenticated user; and outputting the selected print-job to the first or second printing device specified by the information specifying the destination printer device, the authentication-based print-job generation unit comprising:

a second central processing unit configured to access:

a job acquisition module that is configured to be able to acquire, from a first printer driver, a print-job in a first format that can be processed by the first printing device and, from a second printer driver, a print-job in a second format that can be processed by the second printing device, the second format being a format that cannot be processed by the first printing device or a format with no information for specifying a printing person added;

a module that acquires, with respect to the print-job acquired by the job acquisition module, identification information for either a user who has ordered that print-job or another user specified as a printing person, as printing person identification information; and a module that generates an authentication-based print-job by adding the acquired printing person identification information and the information specifying the destination printer device to the print-job acquired by the job acquisition module, and outputs the generated authentication-based print-job to the authentication unit.

4. An authentication unit providing, in cooperation with an authentication-based print-job generation unit, an authentication-based printing function for both a first printing device and a second printing device, the authentication-based print-job generation unit having a first central processing unit configured to execute functions for acquiring, from a first printer driver, a print-job in a first format that can be processed by the first printing device or, from a second printer driver, a print-job in a second format that can be processed by the second printing device, the second format being a format that cannot be processed by the first printing device or a format with no information for specifying a printing person added; acquiring identification information for either a user who has ordered that acquired print-job or another user specified as a printing person, as printing person identification information; and generating an authentication-based print-job by adding the acquired printing person identification information and information specifying a destination printing device to the acquired print-job and outputting the generated authentication-based print-job to the authentication unit, the authentication unit comprising:

a second central processing unit configured to access:

a module that acquires the authentication-based print-job output from the authentication-based print-job generation unit;

a module that extracts from the acquired authentication-based print-job the printing person identification information, the information specifying the destination printing device, and the print-job, and stores them in a storage module in association with each other;

a module that executes authentication for a user who requests execution of printing;

a module that refers to the storage module, and selects a print-job associated with the printing person identification information for the authenticated user; and a module that outputs the selected print-job to the first or second printing device specified by the information specifying the destination printer device.

5. An authentication-based printing method for both a first printing device and a second printing device, comprising:

under the control of a first central processing unit of an authentication-based print-job generation unit:

acquiring, from a first printer driver a print-job in a first format that can be processed by the first printing device or, from a second printer driver, a print-job in a second format that can be processed by the second printing device, the second format being a format that cannot be processed by the first printing device or a format with no information for specifying a printing person added;

acquiring, with respect to the acquired print-job, identification information for either a user who has ordered that print-job or another user specified as a printing person, as printing person identification information; and generating an authentication-based print-job by adding the acquired printing person identification information and information specifying a destination printer device to the acquired print-job, and outputting the generated authentication-based print-job to an authentication unit, and under the control of a second central processing unit of the authentication unit:

acquiring the authentication-based print-job output from the authentication-based print-job generation unit;

extracting from the acquired authentication-based print-job the printing person identification information, the information specifying the destination printer device and the print-job, and storing them in a storage module in association with each other;

executing authentication for a user who requests execution of printing;

referring to the storage module, and selecting a print-job associated with the printing person identification information for the authenticated user; and outputting the selected print-job to the first or second printing device specified by the information specifying the destination printer device.

6. A method for outputting an authentication-based print-job to an authentication unit that provides an authentication-based printing function for both a first printing device and a second printing device, the method comprising:

acquiring, by a first central processing unit, from a first printer driver, a print-job in a first format that can be processed by the first printing device or, from a second printer driver, a print-job in a second format that can be processed by the second printing device, the second format being a format that cannot be processed by the first printing device or a format with no information for specifying a printing person added;

acquiring, by the first central processing unit, with respect to the acquired print-job, identification information for either a user who has ordered that print-job or another user specified as a printing person, as printing person identification information; and generating, by the first central processing unit, an authentication-based print-job by adding the acquired printing person identification information and information specifying a destination printer device to the acquired print-job, and outputting the generated authentication-based print-job to the authentication unit, the authentication unit providing the authentication-based printing function in accordance with the generated authentication-based print-job.

7. A method for executing authentication-based printing in accordance with an authentication-based print-job with respect to both a first printing device and a second printing device, the authentication-based print-job being generated by adding to a print job, from a first printer driver. in a first format that can be processed by the first printing device or a print-job, from a second printer driver, in a second format that can be processed by the second printing device, the second format being a format that cannot be processed by the first printing device or a format with no information for specifying a printing person added, identification information for either a user who has ordered that print-job or another user specified as a printing person, as printing person identification information, and information specifying a destination printer device, the method comprising:

acquiring, by a first central processing unit, the generated authentication-based print-job;

extracting, by the first central processing unit, from the acquired authentication-based print-job the printing person identification information, the information specifying the destination printer device, and the print-job, and storing them in a storage module in association with each other;

executing, by the first central processing unit, authentication for a user who requests execution of printing;

referring, by the first central processing unit, to the storage module, and selecting a print-job associated with the printing person identification information for the authenticated user; and outputting the selected print-job to the first or second printing device specified by the information specifying the destination printer device.

8. A non-transitory computer-readable recording medium in which a program for causing a computer system to execute the method according to claim 5 is recorded.

9. A non-transitory computer-readable recording medium in which a program for causing a computer system to execute the method according to claim 6 is recorded.

10. A non-transitory computer-readable recording medium in which a program for causing a computer system to execute the method according to claim 7 is recorded.

* * * * *